United States Patent [19]
Watson

[11] Patent Number: 5,320,537
[45] Date of Patent: Jun. 14, 1994

[54] MICROSURGICAL TRAINING APPARATUS

[75] Inventor: Neil A. Watson, Raleigh, N.C.

[73] Assignee: Triangle Research and Development Corporation, Raleigh, N.C.

[21] Appl. No.: 33,562

[22] Filed: Mar. 16, 1993

[51] Int. Cl.$^5$ ............................................. G09B 23/28
[52] U.S. Cl. ...................................................... 434/272
[58] Field of Search ................. 434/272, 268, 267, 262

[56] References Cited

U.S. PATENT DOCUMENTS

| | | |
|---|---|---|
| 2,556,043 | 6/1951 | Roucka . |
| 2,704,897 | 3/1955 | Lade ........................ 434/272 |
| 3,027,655 | 4/1962 | Alderson . |
| 3,376,660 | 4/1968 | McGinnis ............................ 434/268 |
| 3,529,363 | 9/1970 | Versaci . |
| 3,704,528 | 12/1972 | Lewis . |
| 3,775,865 | 12/1973 | Rowan ............................... 434/262 |
| 4,321,047 | 3/1982 | Landis ................................ 434/262 |
| 4,331,426 | 5/1982 | Sweeney . |
| 4,481,001 | 11/1984 | Graham et al. ....................... 434/267 |
| 4,642,055 | 2/1987 | Saliterman . |
| 4,773,865 | 9/1988 | Baldwin . |
| 4,789,340 | 12/1988 | Zikria ................................ 434/272 |

FOREIGN PATENT DOCUMENTS

| | | | |
|---|---|---|---|
| 0499125 | 8/1992 | European Pat. Off. ............ | 434/272 |
| 1418804 | 8/1988 | U.S.S.R. ............................... | 434/267 |

Primary Examiner—Gene Mancene
Assistant Examiner—Jeffrey A. Smith
Attorney, Agent, or Firm—Robert G. Rosenthal

[57] ABSTRACT

The invention relates to a disposable, life-like module for use in training physicians and surgeons in the techniques of both human and veterinary microsurgical anastomosis. The module comprises a housing defining a cavity. A pair of spaced apart connectors are connected to the housing and extend therethrough. Each of the connectors includes a bore defining an internal channel for allowing the movement of a fluid through the housing. Each of the channels includes a first end external of the cavity adapted to be in fluid communication with a reservoir and a second end internal of the cavity. A first layer simulates muscle tissue and spans the cavity. An elongate simulated vascular or neurovascular bundle having proximal ends and distal ends spans the chamber and is connected to the respective second connector ends. A pump pumps a fluid simulated blood through a fluid circuit and an optional controller provides pulsatile flow.

16 Claims, 9 Drawing Sheets

MICROSURGICAL TRAINING APPARATUS

FIELD OF THE INVENTION

This invention relates generally to the field of medical training devices and more particularly to disposable devices that can be used to perform microsurgical anastomosis of various structures such as arteries, veins, and nerves under simulated surgical conditions.

BACKGROUND OF THE INVENTION

It has become commonplace to perform complex, lengthy, surgical procedures on human (and to a lesser extent veterinary) nerves and blood vessels that have been damaged as the result of trauma. A significant percentage of these procedures involve anastomosis or reconnection of the nerves and blood vessels. Microvascular and micro-neurrhal anastomosis also form the basis of free tissue transfer in which composite tissues are moved from one part of the body to another. The blood supply must be immediately reestablished by micro-vascular anastomosis. In cases where an extremity, such as a foot, hand, etc. has been injured, anastomosis is often accomplished using cutting-edge technology microsurgical procedures. However, it will be appreciated that reconnecting structures, many of which can be as small as 1.0 millimeter in diameter is an acquired skill which must be painstakingly learned and routinely practiced in the laboratory prior to application in actual clinical practice.

In view of the foregoing, courses have been conducted in hospitals and laboratories throughout the world for the purpose of training surgeons to perform microsurgical anastomosis. The vast majority of these courses have used laboratory rats, which are relatively inexpensive and easy to acquire, as models for the practical side of training. More specifically, the rat femoral artery and vein closely approximate the smallest, and therefore the most difficult, anastomosis that would reasonably be attempted under clinical conditions. Similarly, the rat sciatic nerve closely simulates the smallest neural structures which would be reasonably attempted under clinical conditions. More particularly, the rat model provides vessels and nerves of ideal size (approximately 1 mm external diameter) which closely approximate the smallest vessels used for free tissue transfer and also approximate the dimensions of the digital arteries, nerves and veins. The rat model allows for instruction and practice in end-to-end arterial anastomosis, end-to-side arterial anastomosis, venous anastomosis and interpositional vein grafting. In summary, the rat provides a realistic substitute for learning most of the microanastomotic procedures which would normally be performed on humans and animals in clinical reconstructive practice.

While physically ideal for training medical and veterinary professionals to perform microsurgical procedures, the rat is not without its inherent drawbacks and deficiencies. For example, as the result of the activities of animal rights organizations, the use of animals in laboratory experiments and for training has been severely restricted. In some countries, such as England, the Home Office will no longer allow licenses for the use of animals in survival experiments for instruction and as practice subjects for the learning of surgical techniques.

The use of laboratory animals also has additional drawbacks as it requires professional husbandry, expert handling and anesthesia for "successful" living experiments. In many cases the foregoing requires the involvement of a veterinarian. Furthermore, live animals also require facilities for euthanasia and disposal at the conclusion of non-survival procedures. Such facilities are unavailable in most hospitals.

The foregoing combined makes it less attractive to use animals in training procedures unless absolutely necessary. Thus, a number of attempts have been made in order to find an acceptable substitute.

Human placental vessels have been used to train surgeons in the techniques of micro-surgery and although the vessel quality is obviously good, blood circulation is not present. In addition, human placentas are not always easy to obtain and when available, they are difficult to transport and preserve satisfactorily for subsequent use. In some cases, isolated pig vessels have been employed as training simulators for vessel structures. Again, availability, storage, and transportation are difficult and blood circulation is lacking.

Rodent carcasses have also been employed in an attempt to minimize the use of animals by "re-using" the carcasses of laboratory rodents that have been euthanized following another procedure or experiment. Again, training is provided on a less than optimal model due to lack of circulation, vessel walls having variable consistency and mechanical properties as a consequence of post-mortem changes and freezing. In addition, the carcasses must be disposed of under closely regulated conditions.

In response to the above-noted problems associated with animal models in general, various attempts have been made to eliminate animals altogether and to provide other microsurgical training devices. For example, in some instances foliage leaves have been used in an attempt to develop microsurgical skills but realism was lacking. Similarly, parts of latex surgical gloves have been and still are, used for basic microsurgical training. However, being essentially two dimensional, their use is limited to exercises in handling fine suture material and to placing sutures and tying knots. Although these exercises are of fundamental importance in the training cycle, they do not allow the student to progress to devices used in microvascular anastomosis, nor to practice those dimensional actions required in joining together small vessels. Furthermore, the rubber glove material tends to grip small needles in an unnatural way, so that it is not even an ideal material for these basic exercises. Nevertheless, the foregoing is marketed under the tradename PracticePak by the Sharpoint Company and contains a latex membrane, together with a length of silicone tubing.

Another product known as the Lumley practice block is also marketed as a training tool by the Ethicon Suture Company and includes a double, hinged, microvascular clamp attached to a solid base. Into this can be introduced lengths of thin tubing which can be divided and sutured. The tubing utilized has been medical tubing, usually Silastic manufactured by Dow Corning, as might be used for intravenous catheters. However, realism in appearance, structure, and "feel" are lacking as well as any form of circulating fluid.

With the foregoing in mind it is an object of the present invention to provide a microsurgical training apparatus which closely simulates an authentic look and feel under which microsurgical procedures are performed.

Another object of the present invention is to provide a microsurgical training apparatus that eliminates the need for laboratory animals.

A further object of the present invention is to provide a microsurgical training apparatus that is as life-like as possible.

Moreover another object of the present invention is to provide a microsurgical training apparatus that is easily stored without changes in its mechanical properties and wherein disposal may be effected without the creation of additional "medical waste".

A still further object of the present invention is to provide a surgical training apparatus that includes a pulsatile flow similar to that created in a normally operating cardiovascular system.

An additional object of the present invention is to provide a microsurgical training apparatus that is inexpensive.

Yet another object of the present invention is to provide a microsurgical training apparatus that has virtually unlimited availability.

SUMMARY OF THE INVENTION

The benefits and advantages of the present invention are achieved in a model for use in the training of microsurgical anastomosis techniques. The model is life-like in appearance and texture and comprises a disposable module in the form of a housing defining a cavity. A pair of spaced apart connector means are connected to the housing and extend therethrough. Each of the connector means includes an internal channel for allowing the movement of a fluid through the housing. Each of the channels includes a first end external of the cavity in fluid communication with a reservoir and a second end disposed within the cavity. A first layer simulates human muscle tissue and spans the chamber. An elongate simulated human circulatory organ has a proximal end and a distal end which spans the chamber. The respective ends of the organ are connected to the respective second ends of the connector means.

In addition to the disposable module, a reservoir adapted to hold a fluid is provided as well as a fluid simulating blood. A pump for pumping the simulated blood is also provided. Tubing connects the reservoir to the pump to the respective first ends of the connector means providing a fluid circuit. Thus, when the simulated blood is flowing through the circulatory organ, the organ may be transected to produce an injury site and microsurgical anastomosis can be performed under life-like conditions.

BRIEF DESCRIPTION OF THE DRAWINGS

Other objects and advantages of the invention will become apparent upon reading the following detailed description and appended claims, and upon references to the accompanying drawings in which

DETAILED DESCRIPTION OF THE ILLUSTRATED EMBODIMENTS

While the present invention will be described more fully hereinafter with reference to the accompanying drawings, in which particular embodiments are shown, it is to be understood at the outset that persons skilled in the art may modify the invention herein described while still achieving the favorable results of this invention. Accordingly, the description which follows is to be understood as a broad teaching disclosure directed to persons of skill in the appropriate arts and not as limiting upon the present invention.

Figure 1A:
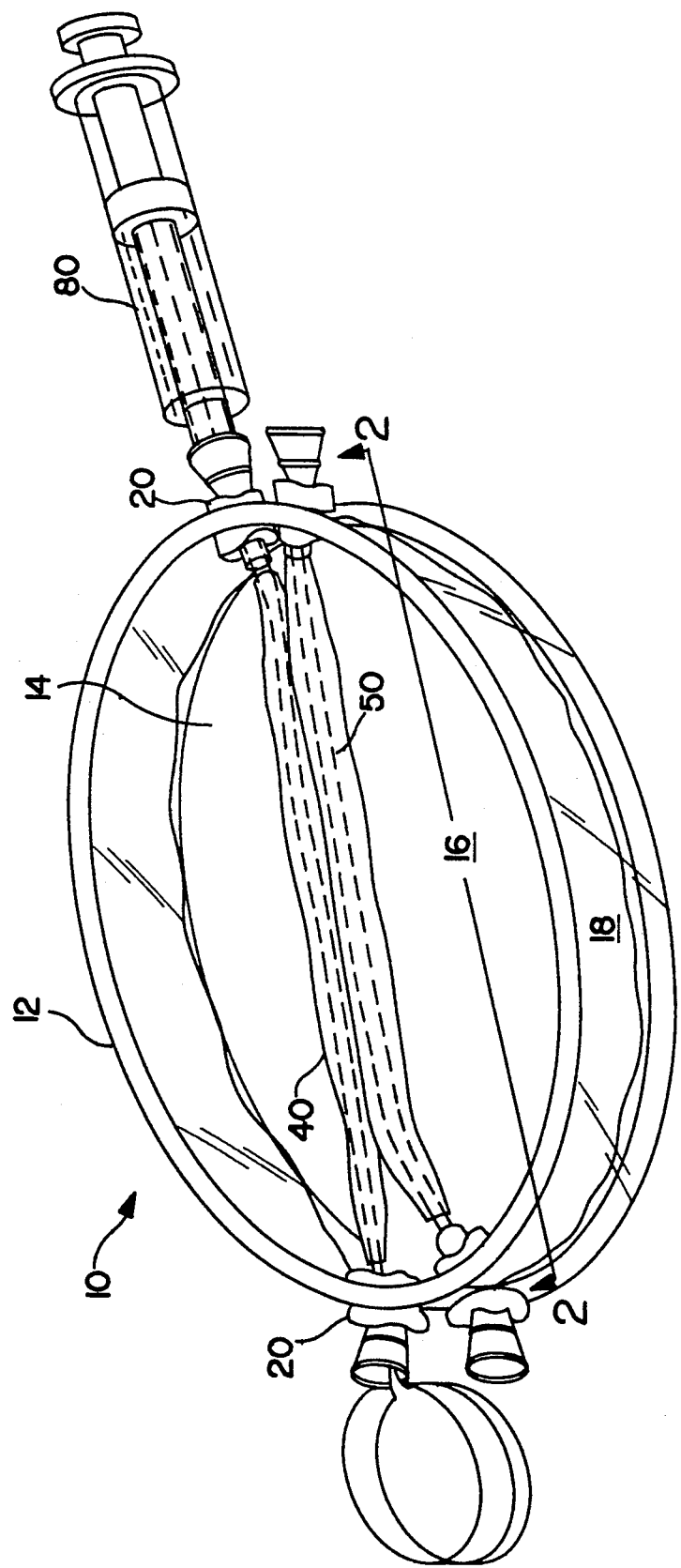
FIG. 1a is a perspective view of the anastomosis module according to the present invention.
Figure 1B:
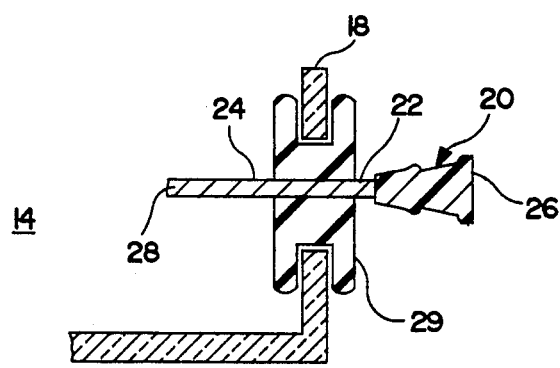
FIG. 1b is a cross-sectional view of the portion of the anastomosis module according to the present invention and showing the connector in detail.
Figure 2:
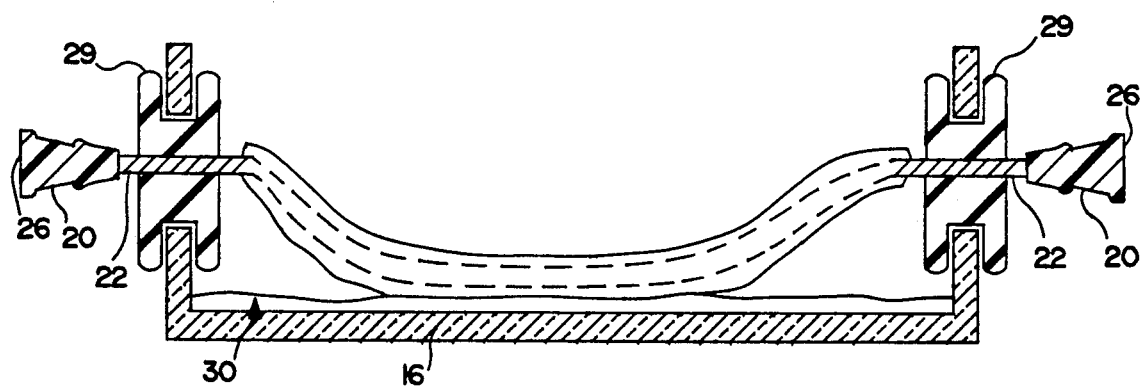
FIG. 2 is a cross-sectional view taken along line 2—2 of FIG. 1a of the anastomosis module according to the present invention.
Figure 3:
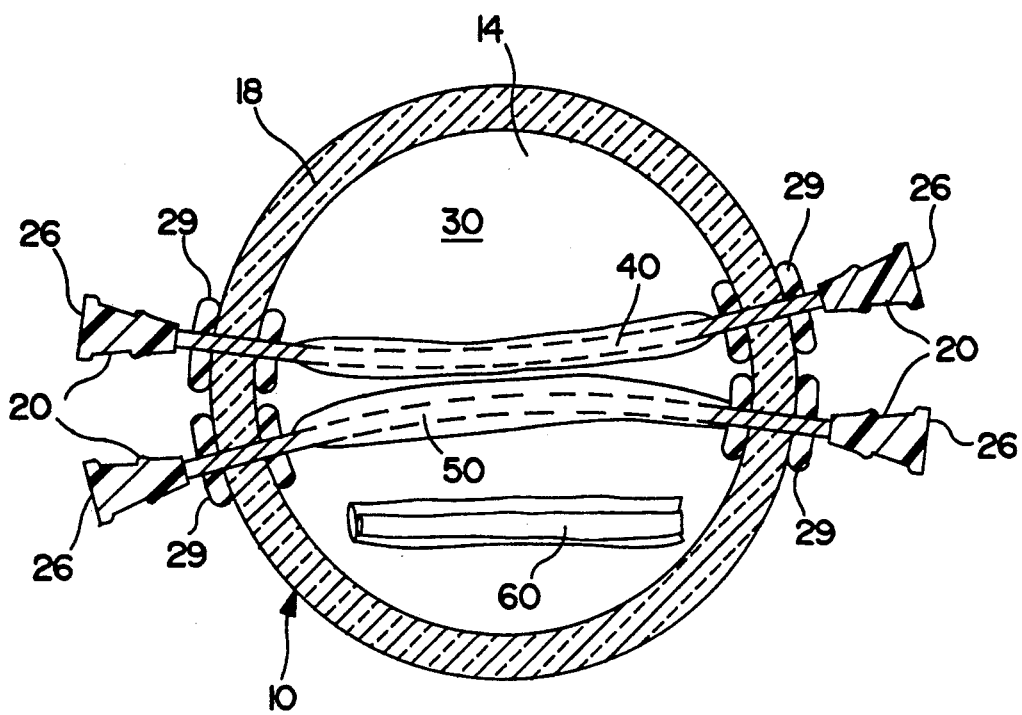
FIG. 3 is a plan view of the anastomosis module according to the present invention.

Referring now more particularly to the drawings and specifically to FIGS. 1 through 3, the module according to the present invention is there illustrated. The module generally indicated at 10 comprises a housing 12 defining a cavity 14. The housing 12 is preferably fabricated from a circular dish approximately 4 inches in diameter and having a bottom 16 and an upwardly extending wall 18, approximately 0.75 inch in height is connected to the peripheral edge of the bottom 16. A commercially available plastic petri dish serves this purpose well.

A pair of spaced-apart connector means or connectors 20 are connected to housing 12. Referring now to only one connector means for a detailed description, the connector extends through wall 18 and includes a bore 22 defining an internal channel 24 for allowing the movement of a fluid through the housing wall 18. The channel 24 has a first end 26 external of the cavity 14 and a second end 28 internal of the cavity 14. In the models that were constructed, the connectors were commercially available "luer fittings": a truncated hypodermic needle is connected with a rubber gasket 29 anchoring the connector 20 with the module wall 18.

A first layer or pad 30 simulating muscle tissue spans the cavity 14 and substantially covers base 16. The layer 30 is a cellulose (wood product) absorbent pad of approximately 3.00 mm. in thickness and of diameter roughly equal to the interior diameter of the module 10. The pad 30 is absorbent and is treated with a non-reflective dye such as commercially available food colorants. The pad 30 enhances the life-like simulation of the background muscle on which the surgical procedure is performed.

Figure 4:
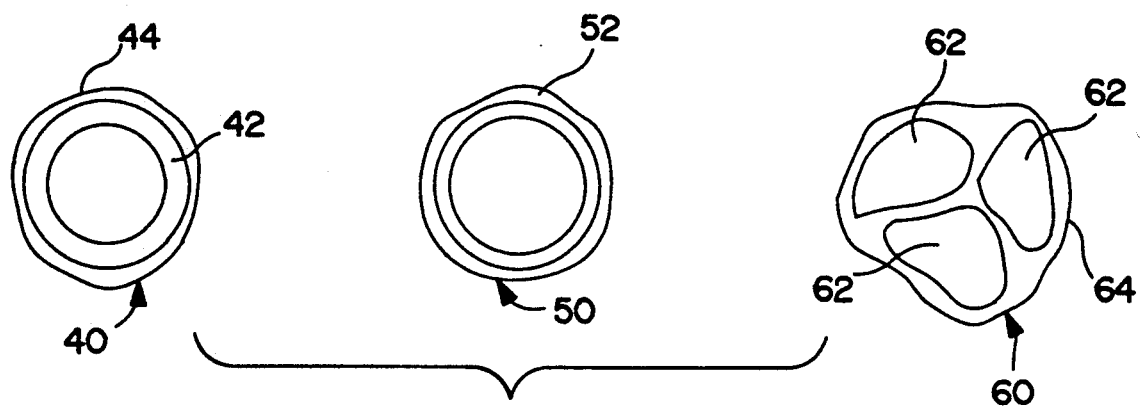
FIG. 4 is a cross sectional view of the components of a simulated neurovascular bundle including an artery, nerve, and vein according to the present invention.

Referring now to FIGS. 3 and 4 as well as FIGS. 9 through 13, a simulated human "neurovascular bundle" is there illustrated as often occurs during microsurgery. The surgeon is confronted with such a neurovascular bundle or the combination of a nerve, an artery, and a vein lying adjacent to each other. Trauma will often cause transection of all of the foregoing and consequently, surgical anastomosis is required on all three "organs". It is, therefore, a useful learning exercise for the surgeon, while in training to be confronted with the same situation. Thus, in the embodiment as shown in FIG. 3, the housing is provided with two sets of connectors 20, one set adapted to hold an artery 40, the second adapted to hold a vein 50 and a nerve bundle 60 lying alongside.

Referring now specifically to the neurovascular structures, each is multilayered and has its own distinct touch, look and feel and is treated differently by the surgeon. For example, the artery 40 comprises a thick layer—the media 42. Surrounding the media 42 is the adventitia 44 (FIG. 4). This simulation is important since a vital part of clinical vessel preparation consists of removing the adventitial layer 44 from the end of the artery 40 to prevent its unwanted invagination into the lumen (a problem which diminishes luminal diameter, and hence flow, and increases the risk of thrombosis, a hazard in all vessel repair, but particularly troublesome in microvascular anastomosis). In the fabrication of the artery 40 standard molding techniques are used to obtain an elongate arterial media segment 42 with an internal diameter of approximately 0.75 mm. The media 42 is fabricated from a first combination of urethanes/polyurethanes with a first polyurethane elastomer mixed in. The media 42 is then rolled in a second mixture of polyurethanes/urethanes and polyurethane elastomers in order to form the adventitial layer 44.

The veins 50 are also covered with an adventitial layer 52. It is thinner than the arterial adventitia, but its presence is important. Without such covering the surgeon can only handle the vessels by direct contact with the vessel wall, a very undesirable method. The main vein wall differs from the arterial simulation in that it is more translucent, softer, has less memory and is more prone to tear, precisely the features which distinguish veins from arteries.

The nerve 60 lies alongside the "vascular bundle", thus making a "neurovascular bundle or neurovascular bundle means." Each nerve comprises 3 of 4 strands of simulated neural material 62 (fascicles) surrounded by an epineurium 64, the outer covering of a peripheral nerve. The epineurium 64 is the structure most frequently sutured when joining two divided nerves together.

As already briefly mentioned, the vascular structures and to a somewhat lesser extent, even the neural structures, within the human body change in texture and ability to stretch and flex, etc. with a person's age or disease state. It is, therefore, necessary to experiment to a certain extent with the different polyurethanes/urethanes and plasticizers in order to attain the desired characteristics for a particular case.

The human vascular organ as described above, whether it be an artery or a vein, has a proximal end 46 and a distal end 48 (FIG. 10), with a hollow core 49 of approximately 1.0 mm in diameter and of sufficient length to span the chamber. The respective ends 46,48 are connected by a press fit to a respective one of the second ends 28 of connectors 20 (FIG. 1b).

Figure 5:
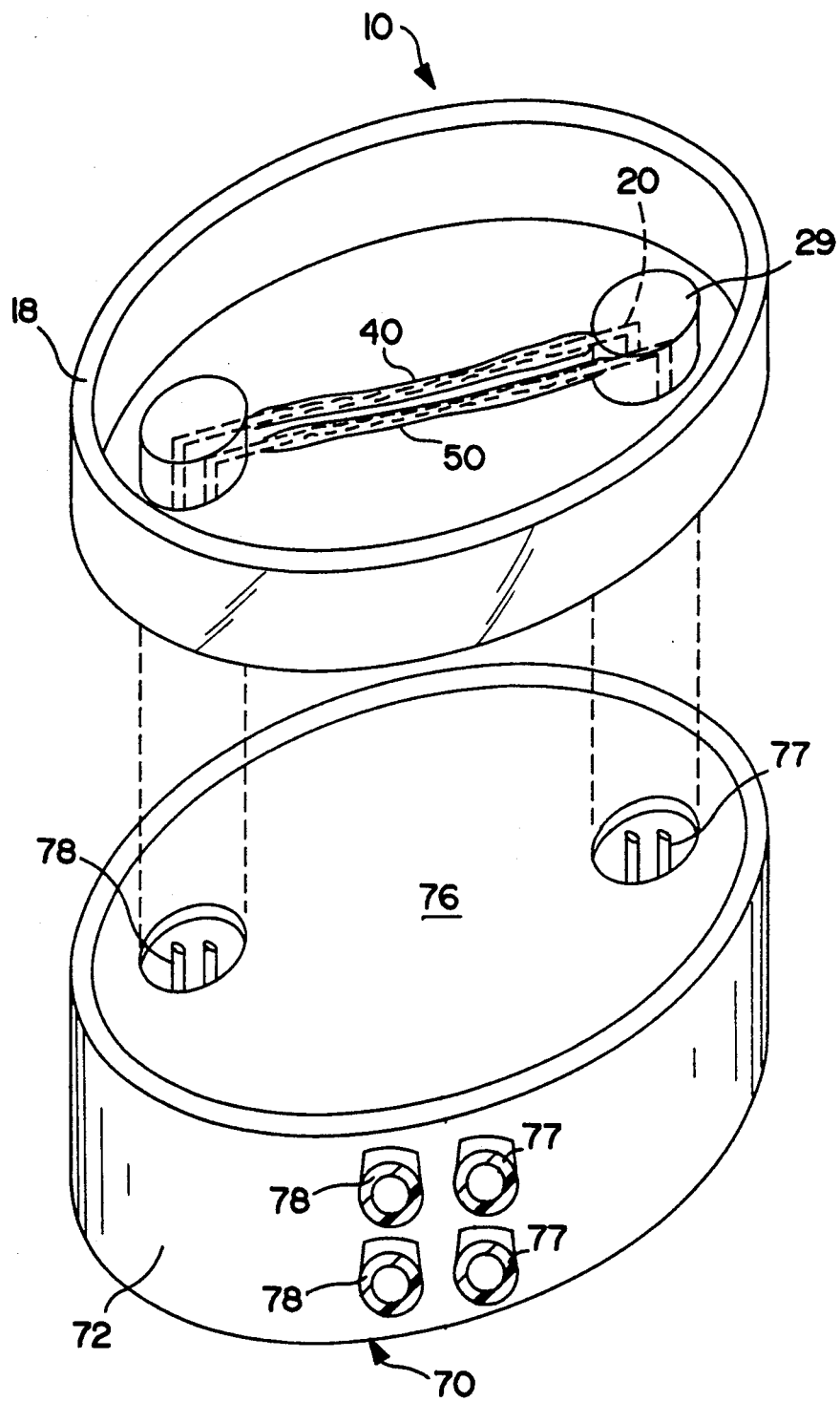
FIG. 5 is a perspective view of a second embodiment of the anastomosis module according to the present invention.
Figure 6:
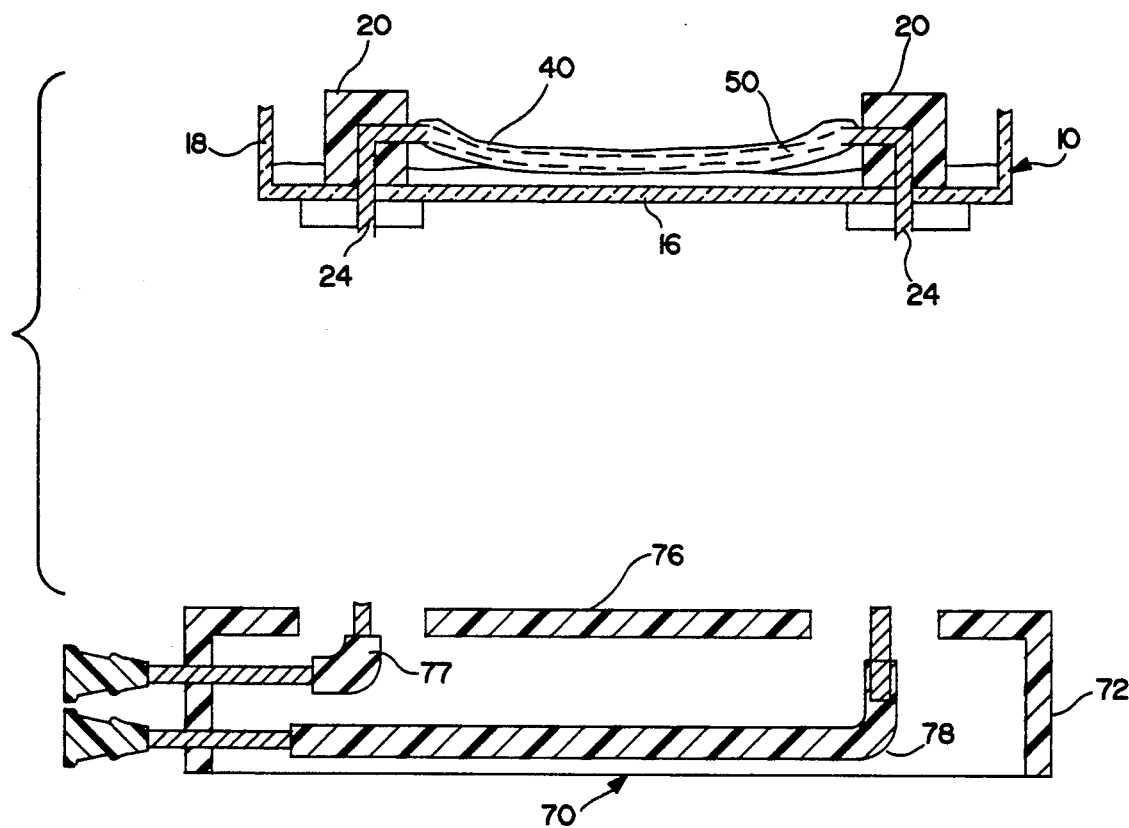
FIG. 6 is a cross-sectional view, of the second embodiment of the anastomosis module according to the present invention.
Figure 7:
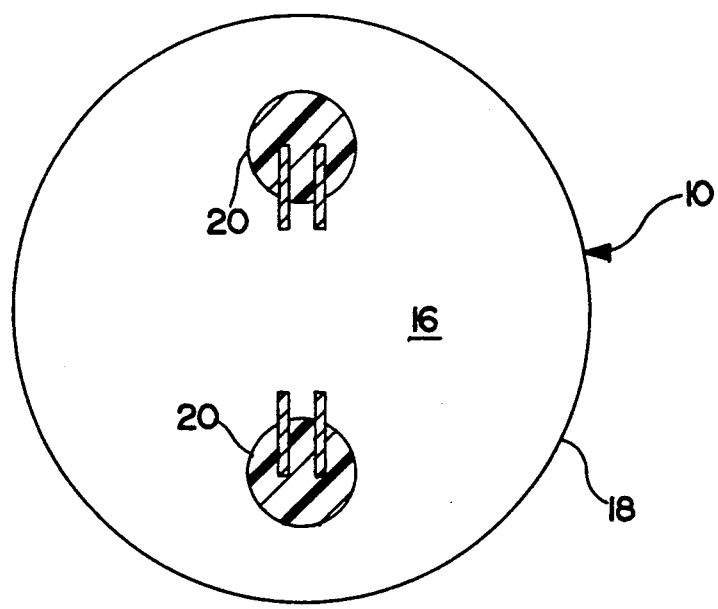
FIG. 7 is a plan view of the second embodiment of the module according to the present invention.
Figure 8:
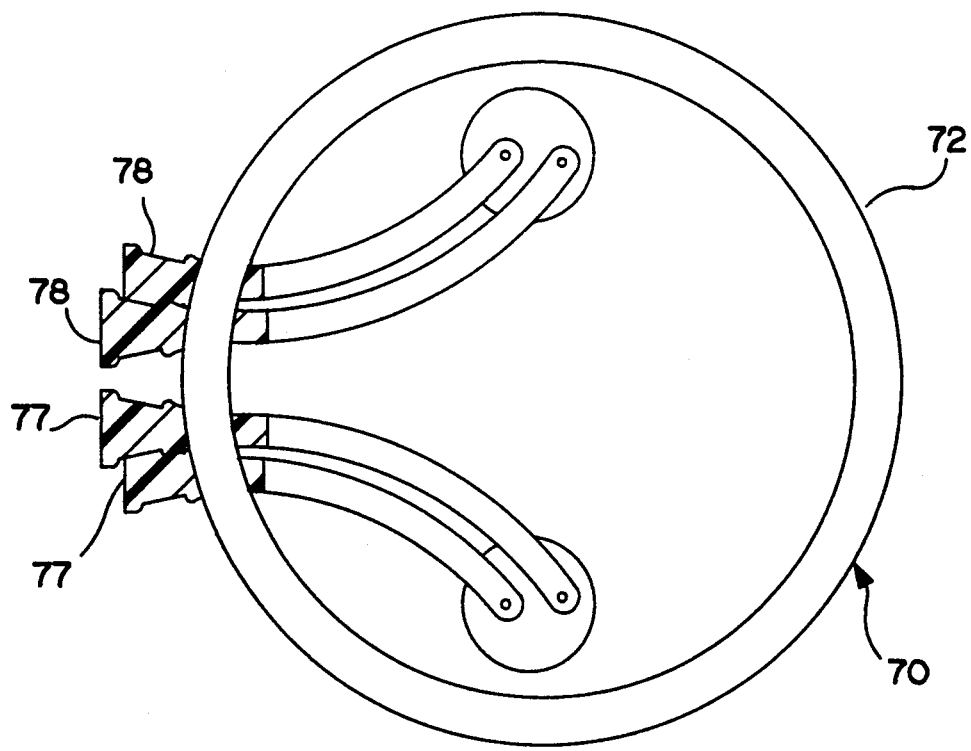
FIG. 8 is a view from beneath the base of the second embodiment according to the present invention and showing the connections to the pump connections.

In an alternate embodiment of the invention, shown in FIGS. 5 through 7, the module is constructed to be placed upon a weighted base 70 that elevates and stabilizes the module 10 to enhance user comfort during the simulated procedures. In that embodiment, the connector means 20 are custom fabricated from steel tubing of 0.40 inch diameter that is bent to form 90 degree angles and which are embedded within rubber or silicone gaskets 29. The connector 20 is press fit into holes defining openings in the bottom of the module. As with the first embodiment discussed above, the tubing is hollow and permits fluid to move through the housing.

The base 70 comprises a casing 72 having a bottom adapted to be placed in contact with a support and a top 76 adapted to contactingly receive the module 10. A first plug means 77 and a second plug means 78 are operatively associated with the top of the base means, each of the plugs 77,78 having one end that matingly receives the respective external end of the corresponding connector 20 and on opposite ends adapted to be in fluid communication with the reservoir.

As already briefly mentioned, a reservoir 80 (FIG. 9) holds a fluid simulating blood. The reservoir 80 may be any plastic container such as a hypodermic needle (for simple operations without pulse) or other type of container having the ability to receive plastic tubing 90 through appropriate fittings (FIG. 9) or otherwise (not shown). Furthermore, the fluid simulating blood is water mixed into corn syrup and a commercially available food colorant (dye).

Figure 9:
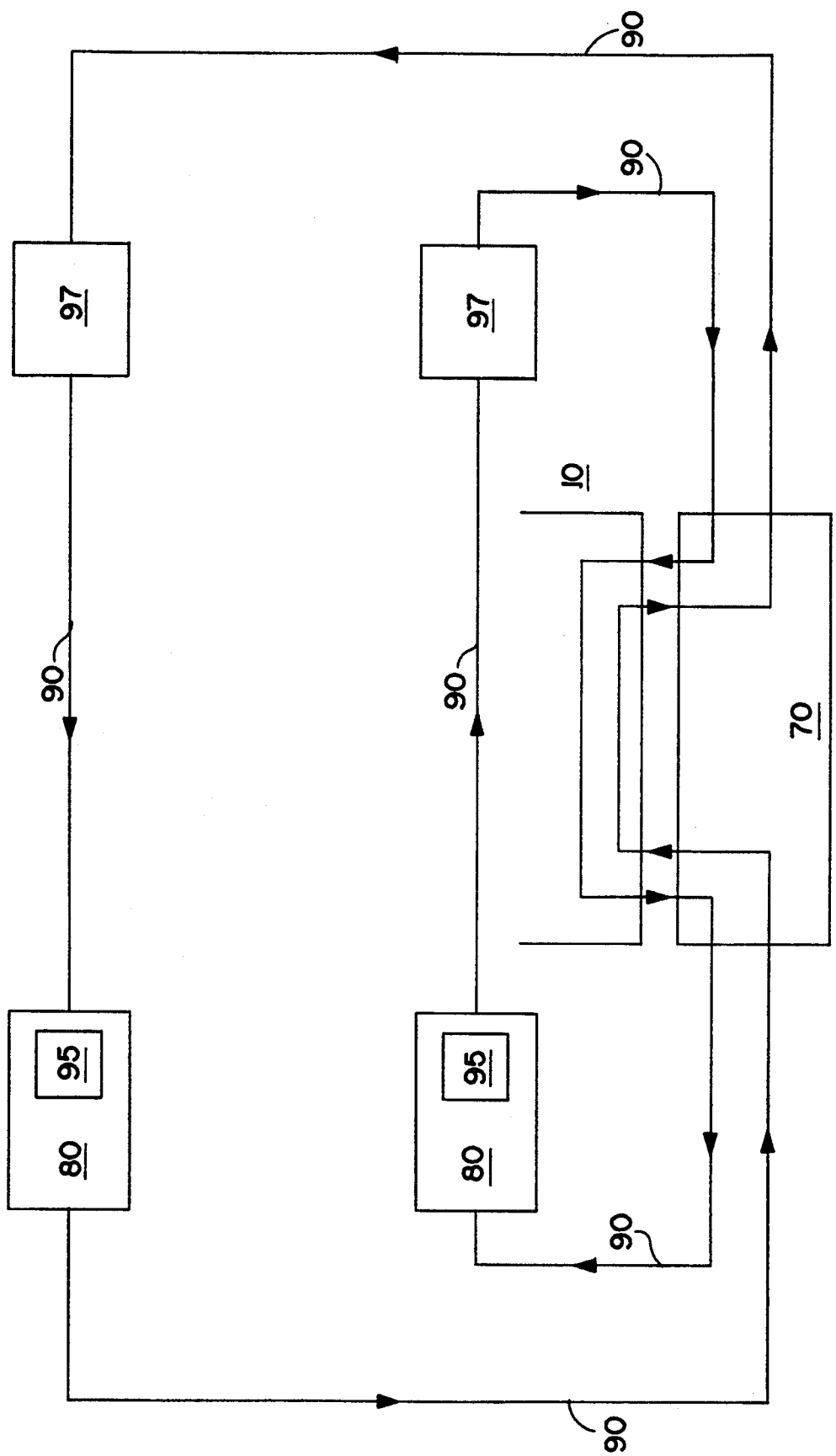
FIG. 9 is a schematic diagram of the fluid circuit including the pump and anastomosis module according to the present invention.
Figure 10:
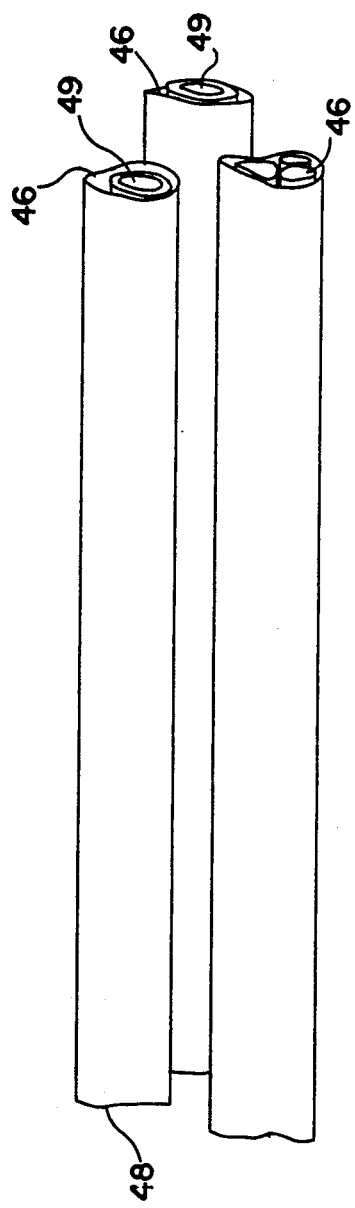
FIG. 10 is a side view taken in perspective of a section of a simulated neurovascular bundle including a nerve, artery, and vein running together and loosely connected to each other according to the present invention.
Figure 11:
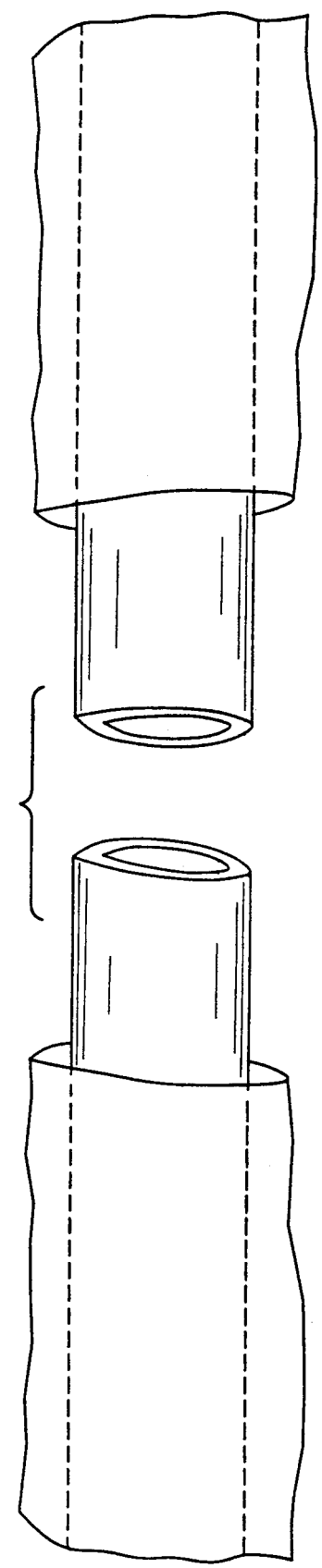
FIG. 11 is a side view of a section of a simulated artery according to the present invention having been transected and showing the advential layer having been resected.
Figure 12:
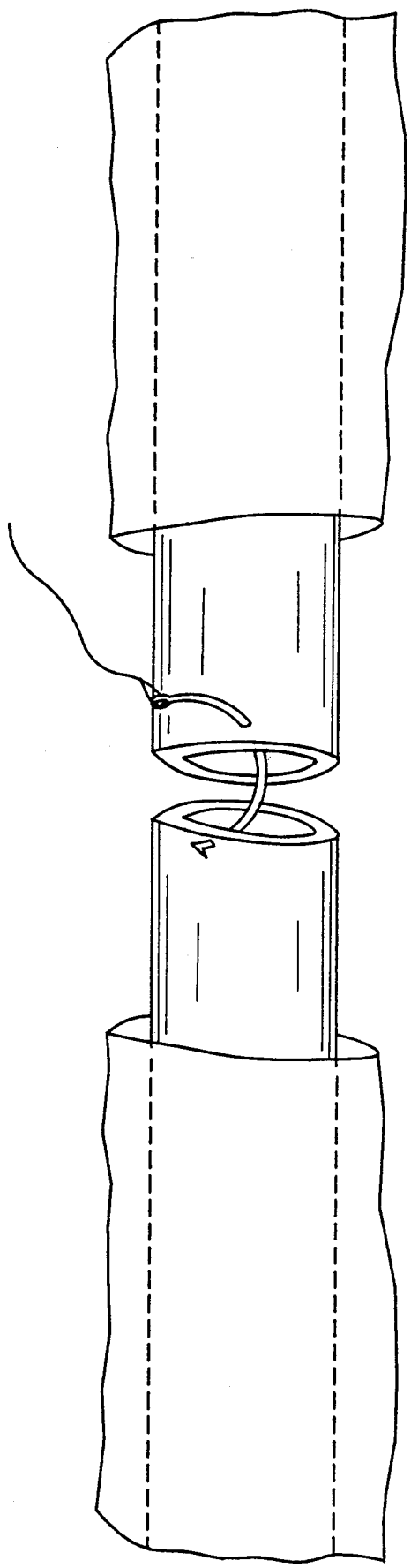
FIG. 12 is a perspective view of the simulated artery of FIG. 11 showing a needle and suture passing through arterial media during the initial phases anastomosis.
Figure 13:
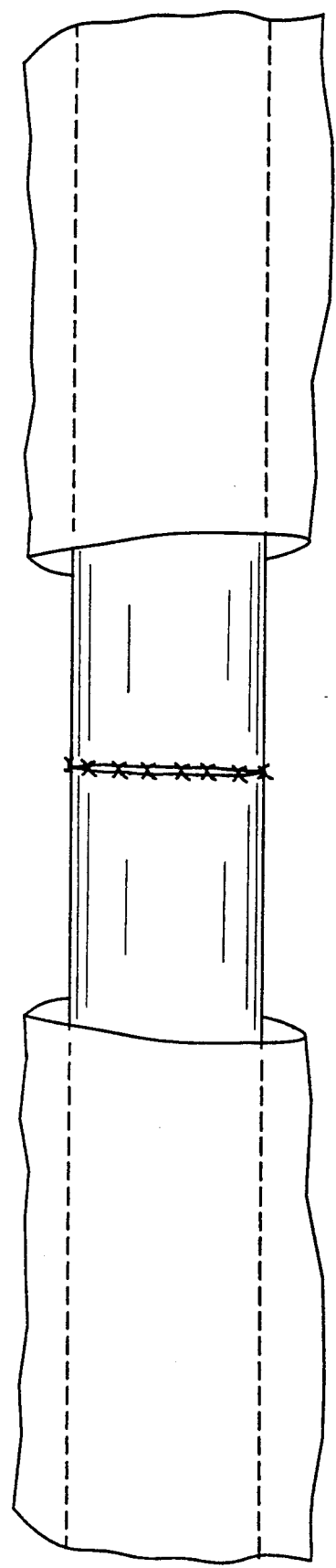
FIG. 13 is a side view of the simulated artery according to the present invention after simulated anastomosis.

Lastly, the fluid circuit is completed by a pump 95 and an electronic controller 97 that generates a modulated electrical signal that imparts a pulsatile flow to the blood in the fluid circuit as shown in FIG. 9 thereby more closely simulating life-like conditions. The pump 95 and controller 97 are well known to those skilled in the art and further discussion thereof is not deemed necessary.

In operation, the base 70 is placed upon a supporting surface and a module 10 containing the desired neurovascular structures is placed thereon (FIGS. 5 through 8). Tubing 90 is connected to each of the plugs 77 in the base 70 and disposed between the free ends of each of the tubing segments 90 are the fluid reservoir 80 and pump 95 in series. The fluid simulating blood is placed into the reservoir 80 and the pump 95 is turned on. The neurovascular structures may then be transected and surgical anastomosis performed. When the procedure is complete, patency of the anastomosis can be checked using standard micro-surgical procedures. The pump may then be turned off. The device allows several anastomosises to be performed before it is necessary to dispose of the training module and to use another one.

The training module provides conditions for all common types of micro-vascular and micro-neurrhal surgery, namely, end-to-end anastomosises of the vein and artery, end-to-side anastomoses and interpositional vein grafting. It also allows of end-to-end nerve suturing and interpositional nerve grafting.

The arrangement of the pumps and connectors (FIG. 9) provides circulation in the arterial simulation in one direction and circulation in the opposite direction in the venous simulation, as occurs in life.

The foregoing embodiments and examples are to be considered illustrative, rather than restrictive of the invention, and those modifications which come within the meaning and range of equivalence of the claims are to be included therein.

That which is claimed is:

1. A disposable, life-like, module for use in training physicians in the techniques of microsurgical anastomosis adapted for use in a system including a reservoir that holds a fluid simulating blood, a pump for pumping the simulated blood, tubing connecting the reservoir to the pump to the module and providing a fluid circuit, the module comprising:

a housing defining a cavity;
   a pair of spaced-apart connector means connected to said housing and extending therethrough, each of said connector means includes a bore defining an internal channel for allowing the movement of a fluid through the housing, each of said channels including a first end external of said cavity adapted to be in fluid communication with a reservoir and a second end internal of said cavity;
   a first layer simulating the surface of human muscle tissue spanning said cavity;
   an elongate simulated human circulatory organ having a proximal end and a distal end and spanning said cavity and overlying said first layer, said organ having a hollow core, the proximal end and the distal end of said organ being connected to a respective one of the connector means adjacent said second channel ends,
   and further wherein said human circulatory organ comprises a first hollow layer of a first consistency and texture and a second layer surrounding and adhering to said first hollow layer, and wherein said second layer has a different consistency and texture from said first layer;
   whereby when the simulated blood is flowing through the human circulatory organ, the human circulatory organ may be transected to produce an injury site and microsurgical anastomosis can be performed under life-like conditions.

2. The module for training microsurgical anastomosis according to claim 1 wherein said first layer comprises an absorbent cellulose pad.

3. The module for training microsurgical anastomosis according to claim 2 wherein said cellulose pad is treated with a non-reflective dye to create a life-like background for practicing microvascular anastomosis.

4. The module for training microsurgical anastomosis according to claim 1 wherein said first hollow layer and said second layer are formed from different combinations selected from the group consisting of urethanes and polyurethanes and a plasticizer.

5. The module for training microsurgical anastomosis according to claim 1 further including a base means for elevating and supporting the module said base means comprising:

a casing having a bottom adapted to be placed in contact with a support and a top adapted to contactingly receive said module;
   a first plug means and a second plug means operatively associated with the top of said base means, each of said plug means having one end adapted to matingly receive the respective external end of said connector and an opposite end adapted to be in fluid communication with said reservoir.

6. The module according to claim 1 wherein said human circulatory organ has an external diameter of approximately 1.00 mm.

7. A model for use in the training of microsurgical anastomosis techniques, characterized by its life-like appearance and texture, comprising:

a housing defining a cavity;
   a pair of spaced apart connector means connected to said housing and extending therethrough, each of said connector means including an internal channel for allowing the movement of a fluid through said housing, each of said channels including a first end external of said cavity in fluid communication with a reservoir and a second end disposed within said cavity;
   a first layer simulating human muscle tissue spanning said chamber;
   an elongate simulated human circulatory organ having a proximal end and a distal end and spanning said chamber and overlying said first layer, the respective ends of said organ being connected to the respective connector means adjacent said internal channel second ends;
   and further wherein said human circulatory organ comprises a first hollow layer of a first consistency and texture and a second a second layer surrounding and adhering to said first hollow layer, and wherein said second layer has a different consistency and texture from said first layer;
   a reservoir adapted to hold a fluid simulating blood;
   a fluid simulating blood;
   a pump for pumping said simulated blood;
   tubing connecting said reservoir to said pump to the respective first ends of said connector means and providing a fluid circuit,
   whereby when the simulated blood is flowing through the circulatory organ, the organ may be transected to produce an injury site and microsurgical anastomosis can be performed under life-like conditions.

8. The model according to claim 7 wherein said first layer comprises cellulose.

9. The model according to claim 7 wherein said first layer comprises cellulose impregnated with dye to produce a non-reflective background.

10. The model according to claim 7 wherein said pump includes a control means for controlling the pump so as to create a life-like pulsatile flow within said organ.

11. A disposable, life-like, module for use in training physicians in the techniques of microsurgical anastomosis adapted to be used in combination with a system including a reservoir that holds a fluid simulating blood, a pump for pumping the simulated blood, tubing connecting the reservoir to the pump to the module and providing a fluid circuit, the module comprising:

a housing defining a cavity;
   a pair of spaced apart connector means connected to said housing and extending therethrough, each of said connector means includes a bore defining an internal channel for allowing the movement of a fluid through the housing; each of said channels including a first end external of said cavity adapted to be in fluid communication with the reservoir and a second end internal of said cavity;

a layer simulating the surface of human muscle tissue spanning said cavity;

an elongated simulated human neurovascular organ means comprising first and second hollow simulated blood vessels, each having an external diameter of approximately 1.0 mm, the first of said blood vessels simulating an artery and the second of said blood vessels having a thinner vessel wall than the first end simulating a vein, each of said blood vessels having proximal and distal ends and spanning said cavity, and the respective proximal ends and distal ends of said first and second blood vessels being connected to a respective one of said connector ends so that the first and second blood vessels lie in side by side relation forming two parallel fluid channels, a simulated human neural organ comprising three elongate strands of simulated neural material encased in a simulated epineurium, said neural organ having an external diameter of approximately 1.2 mm, whereby when the simulated blood is flowing through the simulated blood vessels and the simulated blood vessels may be transected to produce an injury site wherein end-to-end anastomosis of artery and vein, end-to-side anastomosis and interpositional vein grafting may be performed under life-like conditions and transection of the simulated neural organ produces an injury site wherein end to end anastomosis of the simulated neural organ may be performed.

12. The module according to claim 11 wherein said simulated artery comprises a first hollow layer of a first consistency and texture and a second layer surrounding and adhering to said first hollow layer, and wherein said second layer has a different consistency and texture from said first layer.

13. The module for training microsurgical anastomosis according to claim 12 wherein said simulated vein comprises a first hollow layer of a third consistency and texture and a fourth layer surrounding and adhering to said third hollow layer, and wherein said third and fourth layers have different consistency from each other and from the first and second layers.

14. The module for training microsurgical anastomosis according to claim 13 wherein said simulated human neural organ comprises simulated neural material having a consistency different than that of said simulated epineurium.

15. The module for training microsurgical anastomosis according to claim 14 wherein said simulated neural material and said simulated epineurium are formed from different combinations of urethanes and polyurethanes and a plasticizer.

16. The module for training microsurgical anastomosis according to claim 13 wherein said first, second, third and fourth layers are formed from different combinations of urethanes and polyurethanes and a plasticizer.

* * * * *